United States Patent
Sugiura

(10) Patent No.: US 11,728,713 B2
(45) Date of Patent: Aug. 15, 2023

(54) POWER CONVERSION DEVICE

(71) Applicant: DENSO CORPORATION, Kariya (JP)

(72) Inventor: Hiroyasu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 647 days.

(21) Appl. No.: 16/874,652

(22) Filed: May 14, 2020

(65) Prior Publication Data

US 2020/0366169 A1 Nov. 19, 2020

(30) Foreign Application Priority Data

May 17, 2019 (JP) .................................. 2019-093613

(51) Int. Cl.
*H02K 11/40* (2016.01)
*H02K 11/33* (2016.01)
*H02K 11/215* (2016.01)
*B60R 16/03* (2006.01)
*B62D 5/04* (2006.01)

(52) U.S. Cl.
CPC .............. *H02K 11/40* (2016.01); *B60R 16/03* (2013.01); *B62D 5/0409* (2013.01); *H02K 11/215* (2016.01); *H02K 11/33* (2016.01); *H02K 2211/03* (2013.01); *H02K 2213/06* (2013.01)

(58) Field of Classification Search
CPC ...... H02K 11/33; H02K 11/40; H02K 11/215; H02K 2211/03; H02K 2213/06; H02K 11/30; H02K 5/225; B62D 5/0406; B60R 16/03
USPC .................................................. 310/71, 68 R
See application file for complete search history.

(56) References Cited

U.S. PATENT DOCUMENTS

| | | | |
|---|---|---|---|
| 2011/0011633 A1 | 1/2011 | Uchida et al. | |
| 2011/0220979 A1 | 9/2011 | Kawashima et al. | |
| 2012/0286602 A1 | 11/2012 | Uchida et al. | |
| 2015/0189734 A1* | 7/2015 | Nishimoto | H05K 1/0209 361/720 |
| 2016/0036288 A1* | 2/2016 | Yamasaki | B62D 5/0463 310/52 |

(Continued)

FOREIGN PATENT DOCUMENTS

WO   WO-2015190424 A1 * 12/2015 ............... B62D 5/04

OTHER PUBLICATIONS

Shinkawa et al, Multi-Layer Printed Substrate Having Noise Suppression Function, Dec. 17, 2015, WO 2015190424 (English Machine Translation) (Year: 2015).*

(Continued)

*Primary Examiner* — Alexander A Singh
(74) *Attorney, Agent, or Firm* — Maschoff Brennan

(57) ABSTRACT

A power conversion device comprises a power conversion circuit, and a multilayer substrate that includes the power conversion circuit, and has a wiring pattern. The wiring pattern of the multilayer substrate includes a power supply pattern, and a ground pattern. The multilayer substrate includes a first layer and a second layer. The power supply pattern includes a first layer power supply pattern portion in the first layer. The ground pattern includes a second layer ground pattern portion in the second layer. The first layer power supply pattern portion and the second layer ground pattern portion overlap with each other at least in part in a direction perpendicular to a plate surface of the multilayer substrate.

11 Claims, 8 Drawing Sheets

(56) References Cited

U.S. PATENT DOCUMENTS

| | | |
|---|---|---|
| 2018/0201302 A1 | 7/2018 | Sonoda et al. |
| 2019/0029107 A1* | 1/2019 | Nagashima .......... H05K 1/0271 |
| 2019/0052154 A1 | 2/2019 | Sugiura |
| 2019/0126972 A1* | 5/2019 | Okamura ............. H05K 5/0047 |
| 2020/0036269 A1 | 1/2020 | Sugiura |
| 2020/0036318 A1 | 1/2020 | Fujita et al. |

OTHER PUBLICATIONS

U.S. Appl. No. 16/874,651 and its entire file history, May 14, 2020, Kurihara et al..

U.S. Appl. No. 16/874,655 and its entire file history, May 14, 2020, Sugiura.

U.S. Appl. No. 16/874,656 and its entire file history, May 14, 2020, Abe et al..

* cited by examiner

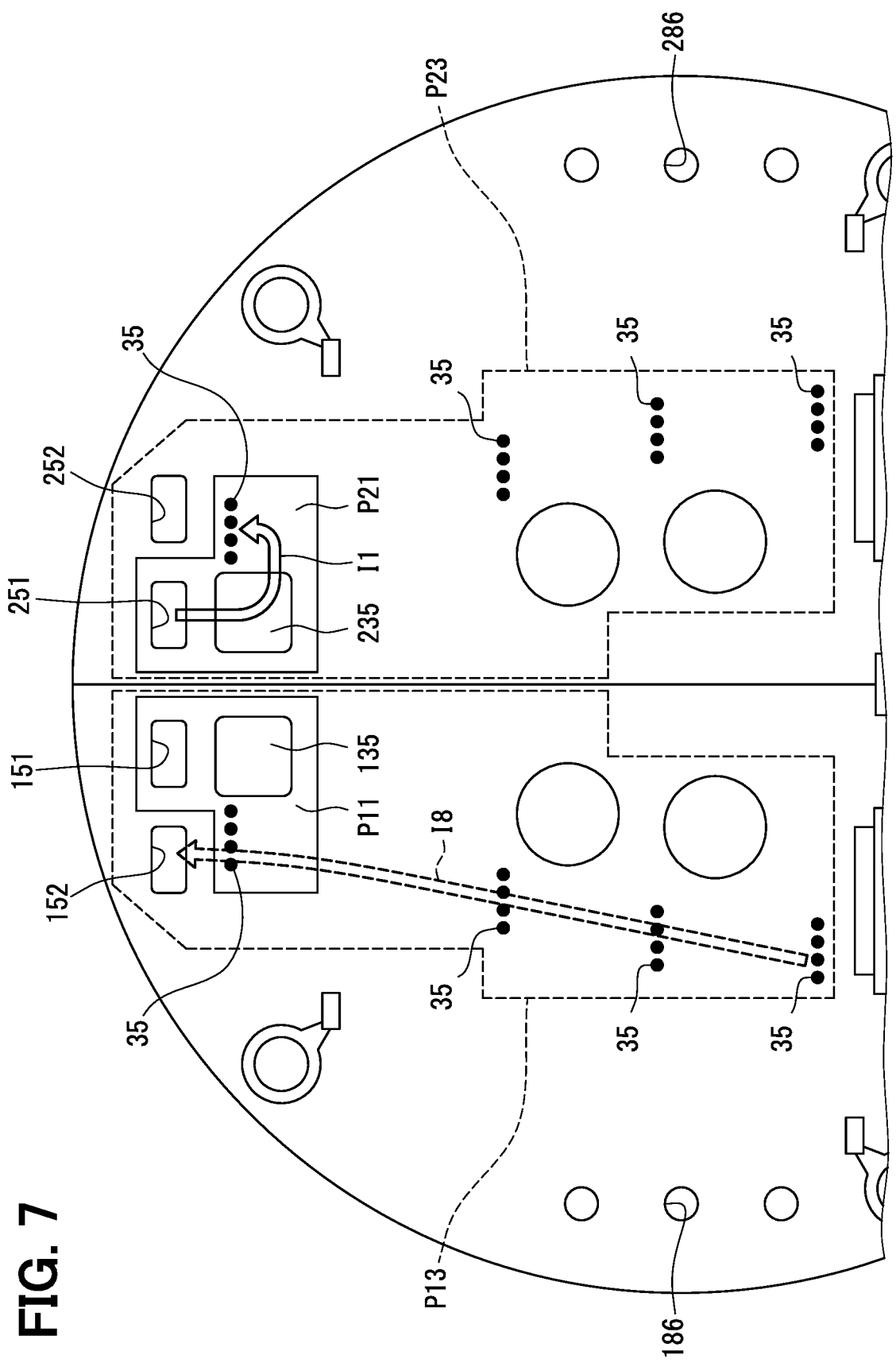

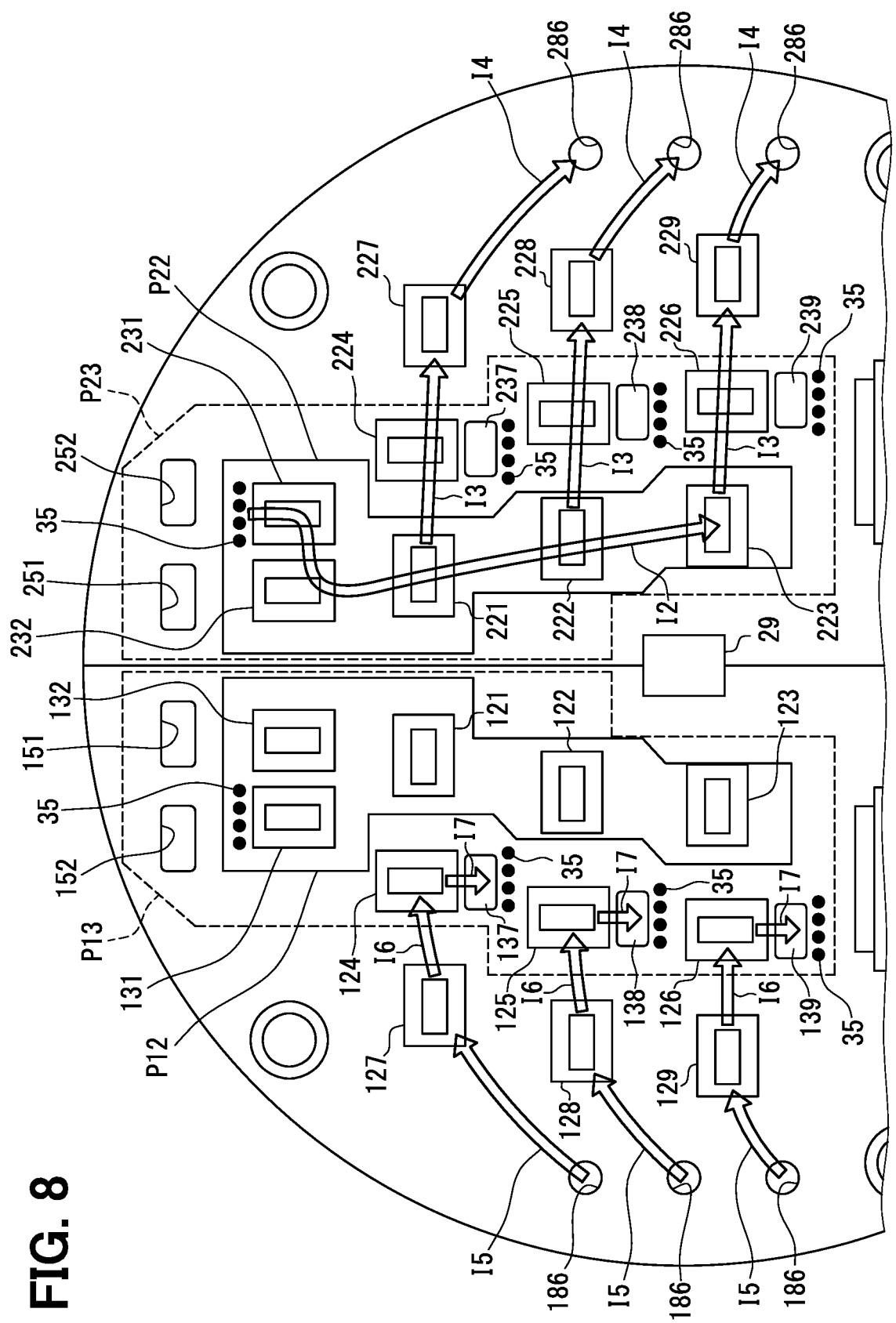

POWER CONVERSION DEVICE

CROSS REFERENCE TO RELATED APPLICATION

This application is based on Japanese Patent Application No. 2019-093613 filed on May 17, 2019, the disclosure of which is incorporated herein by reference.

TECHNICAL FIELD

The disclosure herein relates to a power conversion device for converting a supplied electric power to output the converted electric power.

BACKGROUND

A related art describes a power conversion device including an inverter circuit. A wiring pattern formed on a substrate of the inverter circuit includes a power supply pattern and a ground pattern. The power supply pattern connects a positive side of a power supply and a positive side of the inverter circuit. The ground pattern connects a negative side of the power supply and a negative side of the inverter circuit.

SUMMARY

The present disclosure describes a power conversion device comprising: a power conversion circuit that is configured to convert a supplied electric power to output the converted power; and a multilayer substrate that includes the power conversion circuit, and has a wiring pattern. The wiring pattern of the multilayer substrate includes a power supply pattern and a ground pattern.

BRIEF DESCRIPTION OF DRAWINGS

Objects, features and advantages of the present disclosure will become more apparent from the following detailed description made with reference to the accompanying drawings. In the drawings:

FIG. 7 is an enlarged view of FIG. 4, showing a path of a current flowing from the inverter to a negative side of a power supply; and FIG. 8 is an enlarged view of FIG. 5, showing a path of a current flowing from the motor to the inverter.

DETAILED DESCRIPTION

Figure 1:
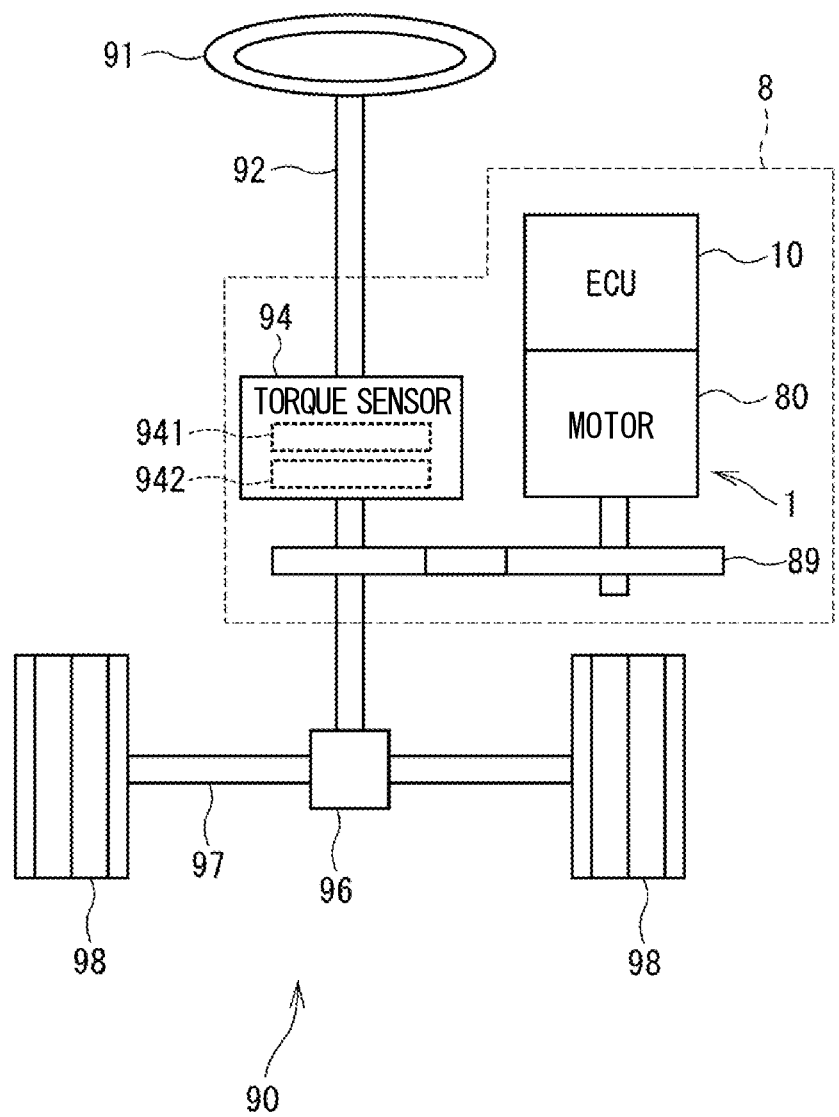
FIG. 1 is a schematic configuration diagram showing a steering system according to a first embodiment.

Regarding a substrate layout of a power conversion device described in a related art, the power supply pattern and the ground pattern disclosed are disposed so as not to interfere with each other when viewed from a direction perpendicular to a plate surface of a substrate. With this configuration, both the patterns disposed in this manner are laid out in which a loop is formed on the substrate when viewed from the perpendicular direction. As a result, both of the loop-shaped patterns function as an antenna, and noise generated by switching of the inverter circuit may be radiated as emission noise which is an electromagnetic wave.

The present disclosure describes a power conversion device capable of reducing emission noise.

According to one aspect of the present disclosure, a power conversion device may comprise: a power conversion circuit that is configured to convert a supplied electric power to output the converted power; and a multilayer substrate that includes the power conversion circuit, and has a wiring pattern. The wiring pattern of the multilayer substrate includes a power supply pattern that is connected to a high potential side of the power conversion circuit to supply electric power, and a ground pattern that is connected to a low potential side of the power conversion circuit. The multilayer substrate includes a first layer and a second layer. The power supply pattern includes a first layer power supply pattern portion in the first layer. The ground pattern includes a second layer ground pattern portion in the second layer. The first layer power supply pattern portion and the second layer ground pattern portion overlap with each other at least in part in a direction perpendicular to a plate surface of the multilayer substrate.

When the power supply pattern and the ground pattern are formed on a single-layer substrate, both the patterns form a loop, and the emission noise may be generated. According to the power conversion device of the present disclosure, a multilayer substrate is employed, so that the following substrate layout can be realized. In other words, the first layer power supply pattern portion and the second layer ground pattern portion are formed in different layers from each other. The two pattern portions are disposed so that at least a part of those pattern portions overlap with each other when viewed from the plate surface perpendicular direction. For that reason, the loop formed by both the pattern portions becomes small, so that the antenna function caused by the loop can be lowered, and thus the emission noise can be reduced.

Multiple embodiments of the present disclosure will be described with reference to the drawings. Incidentally, the same reference numerals are assigned to corresponding components in each embodiment, and therefore duplicate descriptions may be omitted. When only a part of the configuration is described in each embodiment, the configuration of the other embodiments described above can be applied to other parts of the configuration.

First Embodiment

As shown in FIG. 1, a drive device 1 according to the present embodiment includes an electric motor 80 and an electronic control unit (ECU) 10 as a power conversion device. The drive device 1 is applied to an electric power steering device (EPS) 8 for assisting steering operation of a vehicle. FIG. 1 shows an entire configuration of a steering system 90 including the EPS 8. The steering system 90 includes a steering wheel 91 as a steering member, a steering shaft 92, a pinion gear 96, a rack shaft 97, wheels 98, the EPS 8, and the like.

The steering wheel 91 is connected to the steering shaft 92. The steering shaft 92 is provided with a torque sensor 94 for detecting a steering torque. The torque sensor 94 has two torque detection units 941 and 942 provided for each system.

Figure 3:
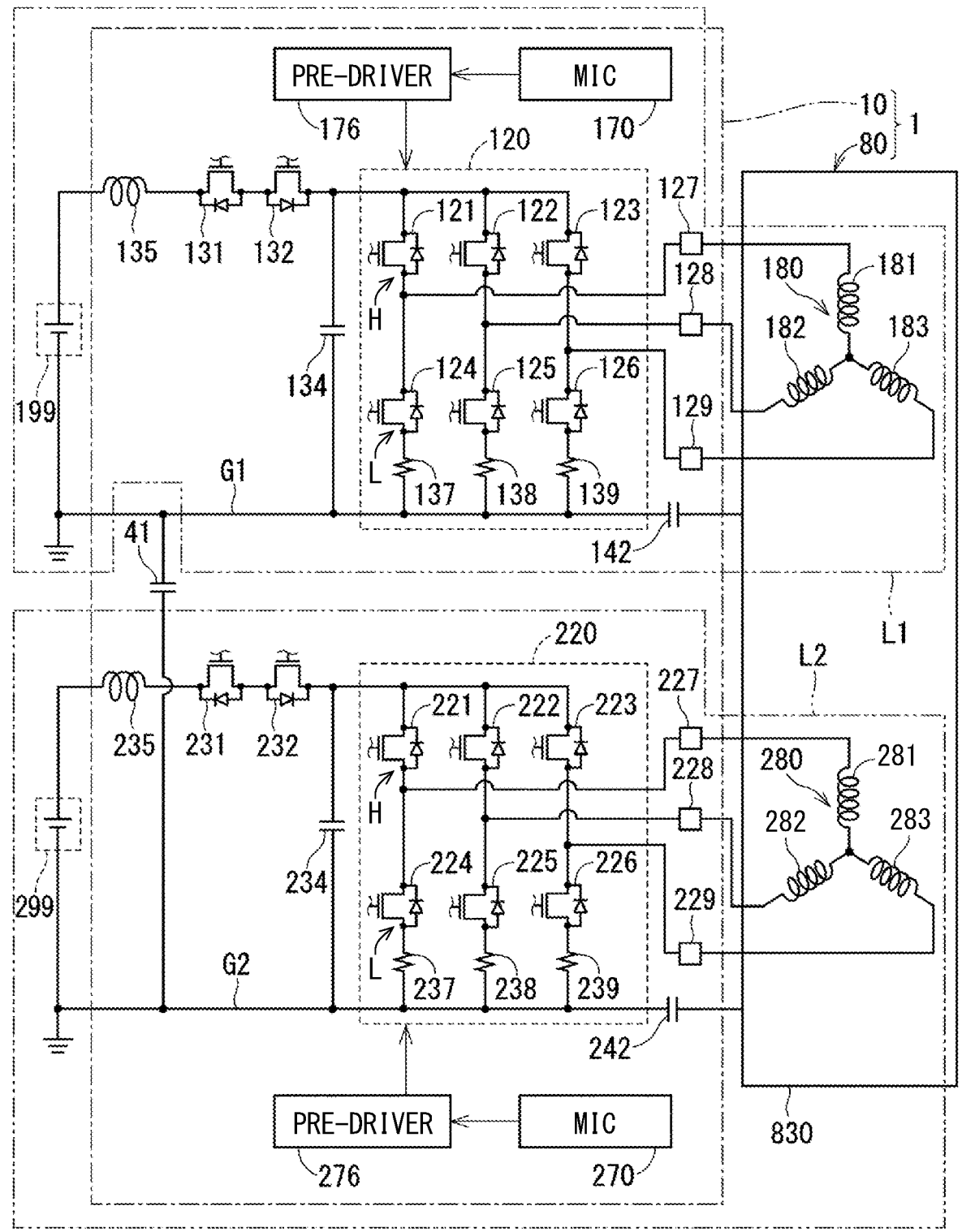
FIG. 3 is a circuit diagram of the drive device shown in FIG. 2.

Detection values of the torque detection units 941 and 942 are output to the microcomputers 170 and 270, which are corresponding microcomputers (see FIG. 3). The pinion gear 96 is provided at a tip of the steering shaft 92. The pinion gear 96 meshes with the rack shaft 97. The pair of wheels 98 is connected to both ends of the rack shaft 97 through tie rods or the like.

When a driver rotates the steering wheel 91, the steering shaft 92 connected to the steering wheel 91 rotates. A rotational motion of the steering shaft 92 is converted into a linear motion of the rack shaft 97 by the pinion gear 96. The pair of wheels 98 are steered to an angle corresponding to the amount of displacement of the rack shaft 97.

The EPS 8 includes the drive device 1, a reduction gear 89 as a power transmission portion for reducing a rotational speed of the motor 80 and transmitting the rotational speed to the steering shaft 92. The steering shaft 92 is a drive target of the EPS 8.

Figure 2:
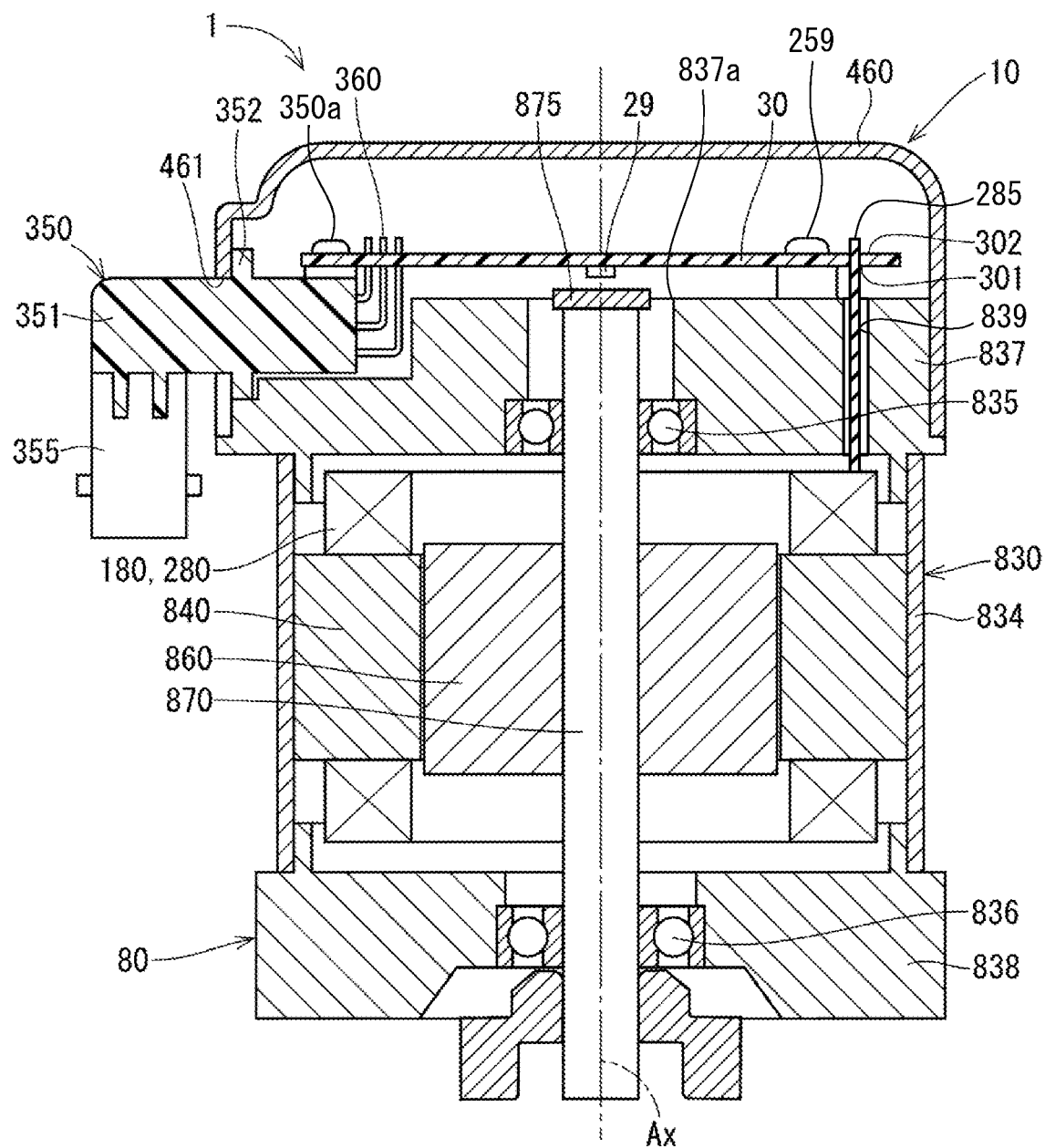
FIG. 2 is a cross-sectional view of a drive device applied to the steering system shown in FIG. 1.

As shown in FIGS. 2 and 3, the motor 80 is a three-phase brushless motor. The motor 80 outputs part or all of a torque required for steering, and is driven by a power supplied from batteries 199 and 299 to rotate the reduction gear 89 forward and backward.

The motor 80 has a first winding 180 and a second winding 280 as a winding set. The windings 180 and 280 have equivalent electrical characteristics and are cancel-wound on a common stator 840 with electrical angles shifted by 30 [deg] from each other. In response to the above configuration, the windings 180 and 280 are controlled to be energized with a phase current whose phase φ is shifted by 30 [deg].

A combination of configurations relating to an energization control of the first winding 180 is referred to as a first system L1. A combination of configurations relating to am energization control of the second winding 280 is referred to as a second system L2. The configuration of the first system L1 is mainly numbered in the 100's, the configuration of the second system L2 is mainly numbered in the 200's, and the configurations substantially similar to each other in the systems L1 and L2 are numbered so that the last two digits are the same, and a description of those configurations will be omitted as appropriate.

As shown in FIG. 2, the drive device 1 has the ECU 10 integrally provided on one side of the motor 80 in an axial direction, which is so-called "electromechanical integrated type" device. The electromechanical integrated type device may be referred to as a "machine/electricity integral type" device. The ECU 10 is provided on the other side of the reduction gear 89 with respect to the motor 80. The ECU 10 is disposed coaxially with a center line Ax of a rotation shaft 870. With the electromechanical integrated type, the ECU 10 and the motor 80 can be efficiently placed in a vehicle having a limited mounting space. When simply referred to as "axial direction" or "radial direction" as appropriate, the axial direction or the radial direction of the motor 80 is meant.

The motor 80 includes a stator 840, a rotor 860, a rotation shaft 870, and a housing 830 that accommodates the stator 840, the rotor 860, the rotation shaft 870, and the like. The stator 840 is fixed to the housing 830, and the windings 180 and 280 are wound around the stator 840. The rotor 860 is provided radially inward of the stator 840 and rotatable relative to the stator 840.

The rotation shaft 870 is fitted into the rotor 860 and rotates integrally with the rotor 860. The rotation shaft 870 is rotatably supported by the housing 830 by the aid of bearings 835 and 836. An end of the rotation shaft 870 on the ECU 10 side protrudes from the housing 830 toward the ECU 10 side. A magnet 875 as a detection target is provided at the end of the rotation shaft 870 on the ECU 10 side.

The housing 830 has a cylindrical case 834, a rear frame end 837 provided at one end of the case 834, and a front frame end 838 provided at the other end of the case 834.

An opening 837*a* through which the rotation shaft 870 is inserted and disposed is provided in the rear frame end 837. A lead wire insertion hole 839 is provided in the rear frame end 837. A lead wire 285 connected to each phase of the windings 180 and 280 is inserted into the lead wire insertion hole 839. The lead wire 285 is taken out from the lead wire insertion hole 839 to the ECU 10. The lead wire 285 is inserted through motor wire connection portions 186 and 286 (see FIGS. 4 and 5) and connected to a substrate 30 by solder or the like.

The ECU 10 includes the substrate 30 and various electronic components mounted on the substrate 30. The substrate 30 is fixed to a surface of the rear frame end 837 opposite to the motor 80 by bolts 259 (see FIG. 2) inserted through substrate connection portions 155 and 255. The bolts 259 are made of a conductive material. A surface of the substrate 30 on the motor 80 side is defined as a motor surface 301, and the surface of the substrate 30 on the opposite side to the motor 80 is defined as a cover surface 302. The cover 460 is formed in a substantially bottomed cylindrical shape and fits radially outward of the rear frame end 837. The cover 460 is provided so as to cover the substrate 30, and protects the ECU 10 from an external impact, and prevents entry of dust, water, or the like into the ECU 10. An opening 461 is provided on a side surface of the cover 460.

A connector 350 includes a base portion 351, a connector portion 355, and connector terminals 360. The connector 350 is fixed to the substrate 30 by bolts 350*a* or the like, and is taken out radially outward from the opening 461. It should be noted that the connector 350 may be structured to be taken out in the axial direction. The opening 461 fits an outside of the flange 352 provided on an outer wall of the base portion 351.

The connector portion 355 is located outside the cover 460, and is provided so that a harness or the like (not shown) can be inserted into and removed from the connector portion 355. The connector portion 355 is divided into a first connector portion connected to the first system L1 side and a second connector portion connected to the second system L2 side.

The connector terminals 360 each protrudes from a radially inner side of the base portion 351. The connector terminals 360 include a first power supply terminal, a first ground terminal, a first signal terminal, a second power supply terminal, a second ground terminal, and a second signal terminal.

Figure 4:
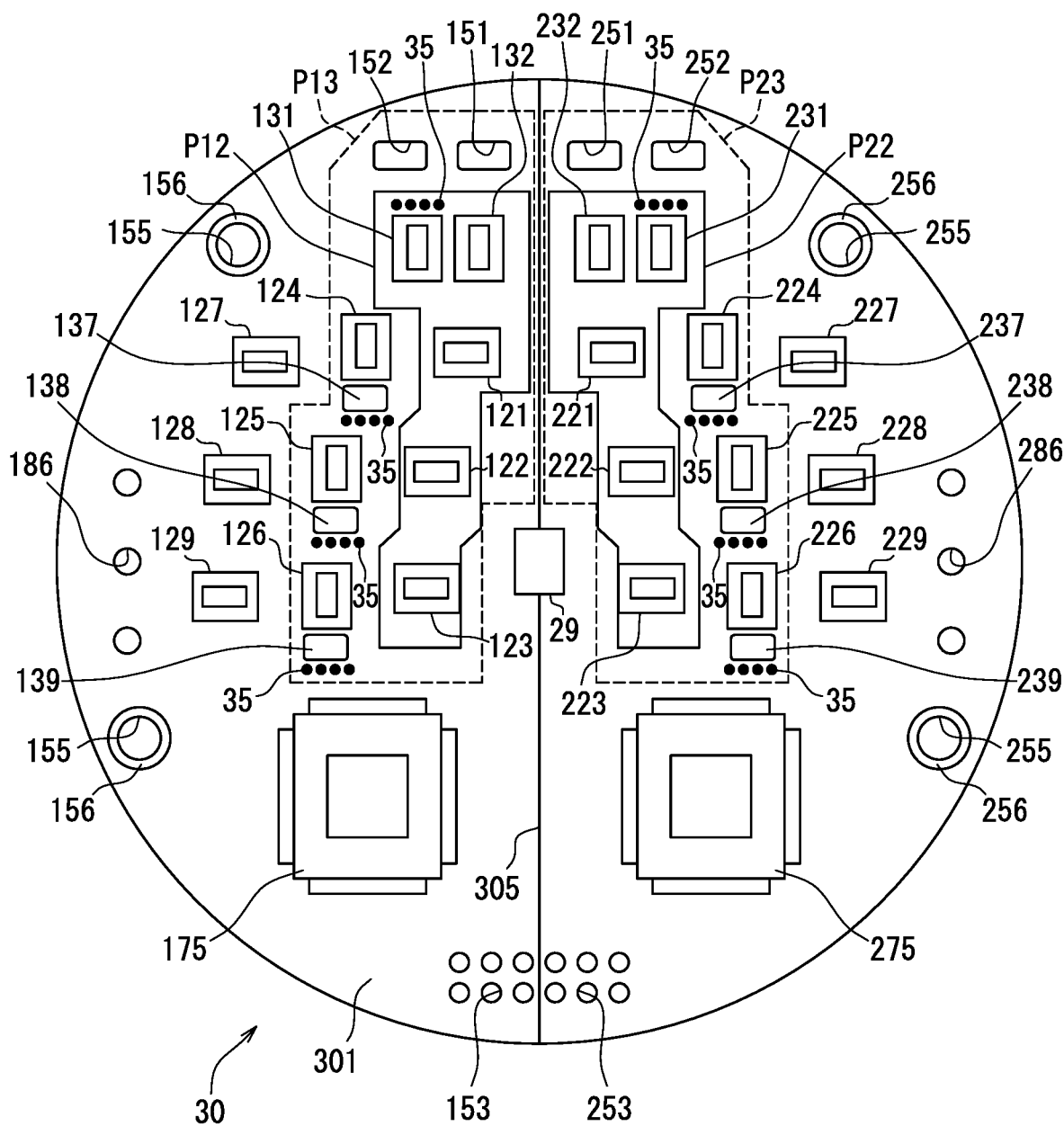
FIG. 4 is a bottom view of an inverter applied to the drive device shown in FIG. 2, when viewed from a motor.
Figure 5:
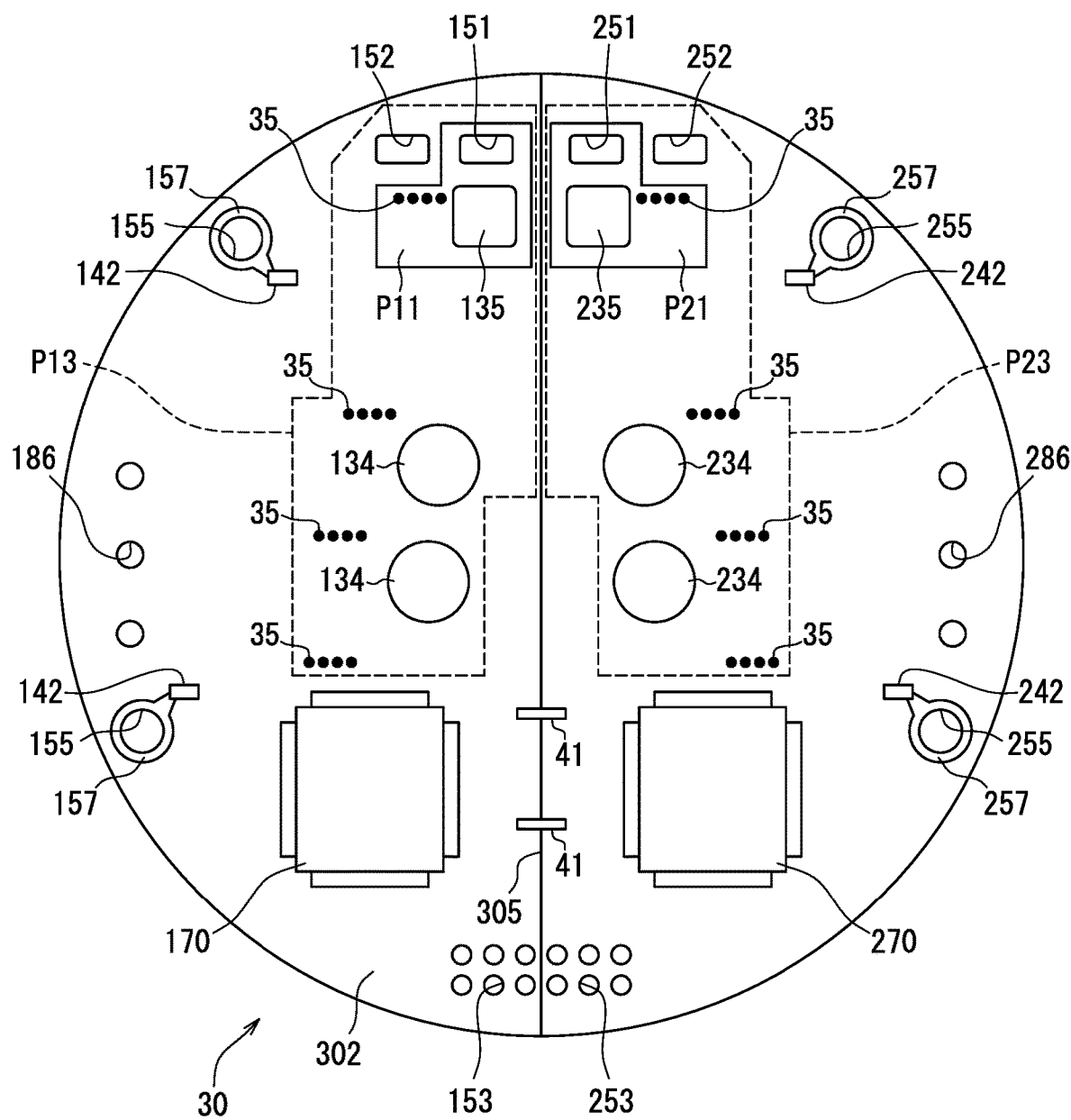
FIG. 5 is a top view of the inverter applied to the drive device shown in FIG. 2, when viewed from an opposite of the motor.

Each of the first power supply terminal, the first ground terminal, and the first signal terminal is inserted from the motor surface 301 side of the substrate 30, and electrically connected to a first power supply terminal connection portion 151, a first ground terminal connection portion 152, and a first signal terminal connection portion 153 (see FIGS. 4 and 5).

Each of the second power supply terminal, the second ground terminal, and the second signal terminal is inserted from the motor surface 301 side of the substrate 30, and electrically connected to the second power supply terminal connection portion 251, the second ground terminal connection portion 252, and the second signal terminal connection portion 253 (see FIGS. 4 and 5). In FIGS. 4 and 5, the number of signal terminals is six for each system, but may be any number of terminals.

FIG. 3 shows a circuit configuration of the drive device 1. The ECU 10 includes a first inverter 120, first motor relays 127 to 129, first power supply relays 131 and 132, a first capacitor 134, and a first coil 135, which are provided corresponding to the first winding 180. The ECU 10 further includes second inverter 220, second motor relays 227 to 229, second power supply relays 231 and 232, a second capacitor 234, and a second coil 235, which are provided corresponding to the second winding 280.

The first inverter 120 and the like of the first system L1 are supplied with an electric power from the first battery 199. The second inverter 220 and the like of the second system L2 are supplied with an electric power from the second battery 299. In the present embodiment, the ground is also separated by the first system L1 and the second system L2. The first microcomputer 170 controls the energization of the first winding 180, and the second microcomputer 270 controls the energization of the second winding 280. In other words, in the present embodiment, the first system L1 and the second system L2 are provided independently of each other in a completely redundant configuration.

The first inverter 120 is a three-phase inverter, and the first switching elements 121 to 126 are connected in a bridge manner. The switching elements 121 to 123 are connected to a high potential side to form an upper arm H. The switching elements 124 to 126 are connected to a low potential side to form a lower arm L. Incidentally, a high potential side may be referred to as a high electric potential side, and a low potential side may be referred to as a low electric potential side. A connection point of the paired U-phase switching elements 121 and 124 is connected to one end of a first U-phase coil 181. A connection point of the paired V-phase switching elements 122 and 125 is connected to one end of a first V-phase coil 182. A connection point of the paired W-phase switching elements 123 and 126 is connected to one end of a first W-phase coil 183. The other ends of the coils 181 to 183 are connected to each other. Shunt resistors 137 to 139, which are current detection elements for detecting currents flowing in the coils 181 to 183, are provided on the low potential side of the switching elements 124 to 126, respectively.

The second inverter 220 has the same configuration as that of the first inverter 120. In other words, the switching elements 221 to 223 are connected to a high potential side to form an upper arm H. The switching elements 224 to 226 are connected to a low potential side to form a lower arm L. Output points of the upper and lower arm circuits of the respective UVW-phases are connected to the respective UVW-phase coils. Shunt resistors 237 to 239, which are current detection elements for detecting currents flowing in the coils 281 to 283, are provided on the low potential side of the switching elements 224 to 226.

The first motor relays 127 to 129 are provided between the first inverter 120 and the first winding 180, and are provided so that the first inverter 120 and the first winding 180 can be disconnected from each other and connected to each other. The U-phase motor relay 127 is provided between the connection point of the switching elements 121 and 124 and the U-phase coil 181. The V-phase motor relay 128 is provided between the connection point of the switching elements 122 and 125 and the V-phase coil 182. The W-phase motor relay 129 is provided between the connection point of the switching elements 123 and 126 and the W-phase coil 183. The second motor relays 227 to 229 have the same configuration as that of the first motor relays 127 to 129, and are provided for the respective UVW-phases.

The first power supply relays 131 and 132 are connected in series with each other so that orientations of parasitic diodes are opposite to each other, and are provided between the first battery 199 and the first inverter 120. The second power supply relays 231 and 232 are connected in series with each other so that orientations of parasitic diodes are opposite to each other, and are provided between the second battery 299 and the second inverter 220. This prevents a current from flowing in a reverse direction and protects the ECU 10 if the batteries 199 and 299 are incorrectly connected in the reverse direction.

The pre-driver 176 outputs a drive signal based on a control signal from the first microcomputer 170. The first switching elements 121 to 126, the first motor relays 127 to 129, and the first power supply relays 131 and 132 are controlled to be turned on and off according to the drive signal. The pre-driver 276 of the second system L2 functions in the same manner as the pre-driver 176 of the first system L1. In other words, the second switching elements 221 to 226, the second motor relays 227 to 229, and the second power supply relays 231 and 232 are on-off controlled by the pre-driver 276. In order to avoid complication, control lines to the motor relays and the power supply relays are omitted in FIG. 3.

The first capacitor 134 is connected in parallel with the first inverter 120, and the second capacitor 234 is connected in parallel with the second inverter 220. The capacitors 134 and 234 are formed of, for example, aluminum electrolytic capacitors. The first coil 135 is provided between the first battery 199 and the first power supply relay 131, and the second coil 235 is provided between the second battery 299 and the second power supply relay 231.

The first capacitor 134 and the first coil 135, and the second capacitor 234 and the second coil 235 each form a filter circuit. Those filter circuits reduce noise transmitted from other devices sharing the batteries 199 and 299. In addition, the filter circuits reduce the noise transmitted from the drive device 1 to the other devices sharing the batteries 199 and 299. In addition, the capacitors 134 and 234 store electric charges, thereby assisting a power supply to the inverters 120 and 220.

An inter-system ground connection capacitor 41 connects a first system ground G1 and a second system ground G2. A first electromechanical connection capacitor 142 connects the first system ground G1 and the housing 830 of the motor 80. A second electromechanical connection capacitor 242 connects the second system ground G2 and the housing 830. The capacitors 41, 142, and 242 are formed of, for example, ceramic capacitors.

The motor surface 301 of the substrate 30 is shown in FIG. 4, and the cover surface 302 is shown in FIG. 5. For the sake of description, the placement of the cover surface 302 is reversed, and the first system L1 is shown on a left side and the second system L2 is shown on a right side of a plane of paper.

As shown in FIG. 4, the switching elements 121 to 126 and 221 to 226 and the shunt resistors 137 to 139 and 237 to 239 are mounted on the motor surface 301 of the substrate 30. The motor relays 127 to 129 and 227 to 229, and the power supply relays 131, 132, 231, and 232 are mounted on the motor surface 301. Further, integrated ICs 175 and 275 and a rotation angle sensor 29 (sensor element) are mounted on the motor surface 301. The integrated IC 175 includes the pre-driver 176, and the integrated IC 275 includes the pre-driver 276. The rotation angle sensor 29 detects a change in a magnetic field by the magnet 875 provided on the rotation shaft 870, and outputs a detection signal corresponding to a rotation angle of the rotation shaft 870.

As shown in FIG. 5, the capacitors 134 and 234 and the coils 135 and 235 are mounted on the cover surface 302 of the substrate 30. Further, the inter-system ground connection capacitor 41, the electromechanical connection capacitors 142 and 242 (see FIG. 3), and the microcomputers 170 and 270 are mounted on the cover surface 302.

As shown in FIGS. 4 and 5, the substrate 30 is electrically separated into two pieces by a slit 305. Parts relating to the first system L1 are mounted on the motor surface 301 and the cover surface 302 in one region. Parts relating to the second system L2 are mounted on the motor surface 301 and the cover surface 302 in the other region.

The rotation angle sensor 29 is disposed in a region of the substrate 30 facing the opening 837a of the rear frame end 837 (opening facing region). The rotation angle sensor 29 is mounted across the slit 305 on the motor surface 301. The inter-system ground connection capacitor 41 is mounted across the slit 305 on the cover surface 302, and connects the first system ground G1 and the second system ground G2.

On the side of the motor surface 301, the housing connection patterns 156 and 256 are annularly exposed from the surface resist layer at the outer edges of the substrate connection portions 155 and 255. On the cover surface 302 side, housing connection patterns 157 and 257 are exposed from the surface resist layer at the outer edges of the substrate connection portions 155 and 255.

The housing connection patterns 156 and 157 formed at the same location are electrically connected to each other by through-hole lands formed on the inner peripheral surface of the substrate connection portion 155, and have the same potential. Similarly, each of the housing connection patterns 256 and 257 has the same potential. The housing connection patterns 156, 157, 256, and 257 are electrically connected to the housing 830 by, for example, bolts (not shown) and have the same potential. Further, the outer edges of the housing connection patterns 156, 157, 256, and 257 are slit over the entire circumference, so as not to be electrically connected to the other wiring patterns on the substrate 30, so that the housing connection patterns 156, 157, 256, and 257 are in so-called floating islands.

The first electromechanical connection capacitor 142 connects the ground pattern P13 of the first system L1 (see FIG. 5) and the housing connection pattern 157. The second electromechanical connection capacitor 242 connects the ground pattern P23 of the second system L2 (see FIG. 5) and the housing connection pattern 257. The housing 830 is connected to the vehicle ground. In other words, the capacitors 41, 142, and 242 are all capacitors for connecting between the grounds. Further, it is conceivable that the inter-system ground connection capacitor 41 connects between the grounds of the power system circuits of the systems L1 and L2.

In the present embodiment, the drive device 1 is applied to the EPS 8, and a large current is supplied in a short time, so that switching noise and ringing noise may be generated. The noise N may be generated mainly in a circuit of the ECU 10, and the generated noise may propagate to the vehicle side through the connector 350 and the motor 80. Therefore, the ground of the substrate 30 and the housing 830 are electrically connected to each other by use of bolts to form a noise feedback path from the motor 80 toward the ECU 10. As a result, the noise generated in the circuit of the ECU 10 is fed back to a noise source, and the noise is inhibited from propagating to the vehicle side.

Figure 6:
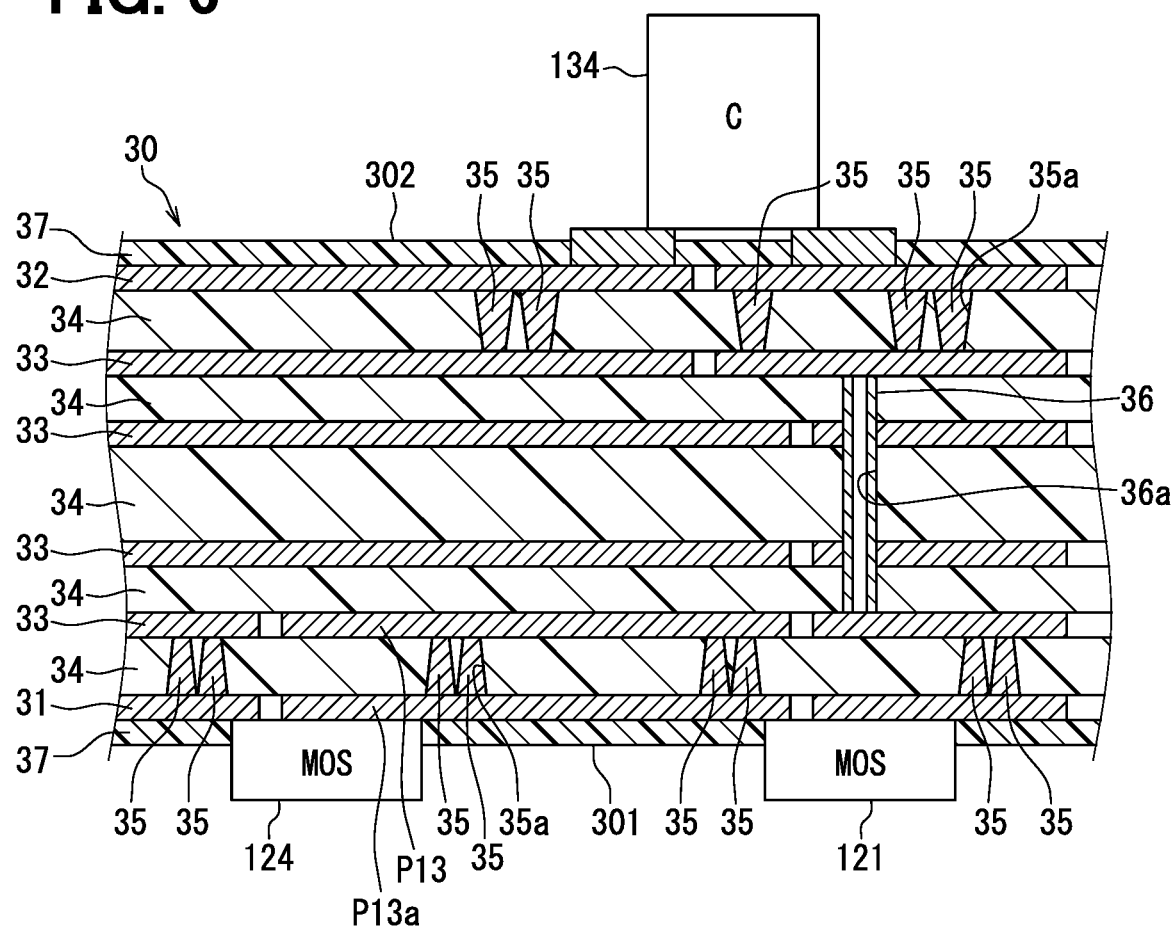
FIG. 6 is a cross-sectional view of the inverter according to the first embodiment.

As shown in FIG. 6, a multilayer substrate is used as the substrate 30 according to the present embodiment. Multiple wiring layers, multiple insulating layers 34, surface resist layers 37, vias, and the like are formed in the substrate 30. Conductive wirings are provided in the wiring layers. The insulating layer 34 having an electrical insulation property is disposed between the adjacent wiring layers.

The wiring layers include surface layers 31 and 32 and inner layers 33. The surface layers 31 and 32 are outermost layers of all the wiring layers. The inner layers 33 are layers located inside the entire wiring layers. In an example of FIG. 6, the inner layers 33 include four layers (multiple layers). The surface layers 31 and 32 are covered with surface resist layers 37. The surface resist layer 37 covering the surface layer 31 forms the motor surface 301. The surface resist layer 37 covering the surface layer 32 forms the cover surface 302.

The vias include through-hole vias (not illustrated) and inner vias 35a and 36a. The through-hole vias are shaped to penetrate through all of the surface layers 31, 32 and the inner layers 33 (all wiring layer). The inner vias 35a are shaped to extend across one of the surface layers 31 and 32 and one inner layer 33 adjacent to the one surface layer. The inner via 36a is shaped to extend across all the inner layers 33 except for the surface layers 31 and 32. The inner vias 35a are provided by laser machining, and the inner via 36a is provided by drilling.

Inner surfaces of the through-hole vias and the inner via 36a are subjected to plating 36 as conductive members. The plating 36 is cylindrically shaped to provide a space inside. A non-conductive member (not shown) is packed inside the cylinder of the inner via 36a. On the other hand, a conductive member is buried in each of the inner vias 35a. The conductive member has a solid shape, and is referred to as a solid via 35. The solid vias 35 and the plating 36 electrically connect wiring patterns formed in arbitrary wiring layers. Specific examples of a material of the plating 36 and the solid vias 35 include copper.

A part of the wiring pattern formed in the wiring layer functions as a wiring for connecting the electronic components shown in FIG. 3. The wiring patterns include the ground patterns P13 and P23 and the power supply patterns P11, P12, P21, and P22. Those patterns are provided in each of the first system L1 and the second system L2.

(Details of Ground Pattern)

The ground patterns P13 and P23 provide a part of the grounds G1 and G2, and are electrically connected to the ground terminal connection portions 152 and 252 described above. The ground patterns P13 and P23 are electrically connected to the electromechanical connection capacitors 142 and 242 and the inter-system ground connection capacitor 41 in the surface layer 32 on the cover surface 302 side. The respective ground patterns P13 and P23 are electrically connected to low-potential side terminals of the capacitors 134 and 234 and the shunt resistors 137 to 139 and 237 to 239 in the surface layer 31 on the motor surface 301 side.

The ground patterns P13 and P23 shown in FIG. 7 and FIG. 8 are part of the ground patterns provided in all the wiring layers, and the other ground patterns are omitted in the drawing. The ground patterns P13 and P23 are provided on the inner layer 33.

The ground patterns of the same systems provided in different wiring layers are connected to each other by multiple solid vias 35 and the plating 36. For example, in FIG. 6, the ground pattern P13 of the inner layer 33 and the ground pattern P13*a* provided on the surface layer 31 are connected to each other by the multiple solid vias 35 and the plating 36. For example, in FIGS. 7 and 8, the ground pattern of the surface layer 31 (not shown) connected to the low-potential side terminals of the shunt resistors 137 to 239 and the ground patterns P13 and P23 of the inner layer 33 are connected to each other by the multiple solid vias 35.

The ground pattern P13 of the first system L1 is shaped to include the whole (that is, an entire area) of the power supply relays 131 and 132, the switching elements 121 to 126, and the shunt resistors 137 to 139 when viewed from the direction perpendicular to the plate surface of the substrate 30 (plate surface perpendicular direction). Similarly, the ground pattern P23 of the second system L2 is shaped to include the whole of the power supply relays 231 and 232, the switching elements 221 to 226, and the shunt resistors 237 to 239 when viewed from the plate surface perpendicular direction. In other words, all of the components such as the power supply relays 231 and 232, the switching elements 221 to 226, and the shunt resistors 237 to 239 are overlapped with the ground patterns P13 and P23 when viewed from the plate surface perpendicular direction.

The coils 135 and 235 and the capacitors 134 and 234 provided on the cover surface 302 are also entirely overlapped with the ground patterns P13 and P23 when viewed from the plate surface perpendicular direction. The component group overlapped with the ground patterns P13 and P23 among the components provided on the surface layers 31 and 32 is referred to as ground pattern overlapped components. The solid vias 35 connected to the ground pattern overlapped component are also overlapped with the ground patterns P13 and P23. For example, as shown in FIGS. 7 and 8, the solid vias 35 connected to the shunt resistors 237 to 239 and the solid vias 35 connected to the power supply relay 131 are also entirely overlapped with the ground patterns P13 and P23 when viewed from the plate surface perpendicular direction.

(Details of Power Supply Pattern)

The power supply patterns P11 to P22 are connected to the high potential side of the inverters 120 and 220 to supply an electric power. The power supply patterns P11 to P22 of the respective systems are electrically connected to the high-potential side terminals of the capacitors 134 and 234 and the power supply relays 132 and 232 in the surface layer 31 on the motor surface 301 side. The power supply patterns P11 to P22 of the respective systems are electrically connected to the high-potential side terminals of the switching elements 121 to 123 and 221 to 223.

The power supply patterns P11 to P22 shown in FIGS. 7 and 8 are a part of the power supply patterns provided in each of all the wiring layers, and other power supply patterns are omitted in the drawing. The illustrated power supply patterns P11 and P21 are provided on the surface layer 32 on the cover surface 302 side. The illustrated power supply patterns P12 and P22 are provided on the surface layer 31 on the motor surface 301 side.

The power supply patterns of the same systems provided in different wiring layers are connected to each other by the multiple solid vias 35 and the plating 36. For example, in FIGS. 7 and 8, the power supply patterns P12 and P22 of the surface layer 31 to which the first power supply relays 131 and 231 are connected and the power supply patterns P11 and P21 of the surface layer 32 are connected to each other by the multiple solid vias 35 and the plating 36.

The power supply pattern P11 of the first system L1 provided on the surface layer 32 is shaped to include the whole of the power supply terminal connection portion 151 and the coil 135 when viewed from the plate surface perpendicular direction. The power supply pattern P21 of the second system L2 provided on the surface layer 32 is similarly shaped to include the whole of the power supply terminal connection portion 251 and the coil 235 when viewed from the plate surface perpendicular direction. In other words, the whole of the power supply terminal connection portions 151 and 251 and the coils 135 and 235 are overlapped with the power supply patterns P11 and P21 when viewed from the plate surface perpendicular direction.

The power supply pattern P12 of the first system L1 provided on the surface layer 31 is shaped to include the whole of the switching elements 121 to 123 and the power supply relays 131 and 132 when viewed from the plate surface perpendicular direction. In the same manner, the power supply pattern P22 of the second system L2 provided on the surface layer 31 is shaped to include the whole of the switching elements 221 to 223 and the power supply relays 231 and 232 when viewed from the plate surface perpendicular direction. In other words, the switching elements 121 to 223 and the power supply relays 131 to 232 are entirely overlapped with the power supply patterns P12 and P22 when viewed from the plate surface perpendicular direction.

Among the components provided on the surface layer 31, the component group overlapped with the power supply patterns P12 and P22 is referred to as power supply pattern overlapped components. The solid vias 35 connected to the power supply pattern overlapped components are also overlapped with the power supply patterns P12 and P22. For example, as shown in FIGS. 7 and 8, the solid vias 35 connected to the power supply relays 131 and 231 are also overlapped with the power supply patterns P11 to P22 when viewed from the plate surface perpendicular direction.

(Current Motor Output Path)

A current path on the substrate 30 which flows through the power supply patterns P11 to P22 and the ground patterns P13 and P23 will be described with reference to FIGS. 7 and 8. In the first system L1 and the second system L2, currents flow through independent current paths.

First, the current path until the current supplied from the second battery 299 to the ECU 10 is output to the motor 80 will be described by use of arrows I1 to I4 attached to the second system L2 in the drawing. Although the arrows I1 to I4 are not shown in the first system L1, a current path similar to that of the second system L2 is formed.

As indicated by an arrow I1 in FIG. 7, the current supplied from the power supply terminal connection portion 251 flows through the power supply pattern P21 and the coil 235. Thereafter, as indicated by an arrow I2 in FIG. 8, the current flows into the power supply pattern P22 through the solid vias 35 and the plating 36. Thereafter, the current flowing through the power supply pattern P22 is distributed to the switching elements 221 to 223 included in the upper arm H of each phase. Thereafter, as indicated by an arrow I3 in FIG. 8, a current flows from a midpoint between the upper arm H and the lower arm L of each phase, that is, from the low potential side of the switching elements 221 to 223 to the motor relays 227 to 229. Thereafter, as indicated by an arrow I4 in FIG. 8, a current flows from the motor relays 227 to 229 to the motor wire connection portion 286, and a current flows into the second winding 280.

In short, the power supply pattern P21 is generally disposed in a portion close to the outer peripheral edge of the substrate 30. The power supply pattern P22 is disposed in a portion closer to the center of the substrate 30 than the power supply pattern P21. The current flowing through the power supply pattern P22 flows from the portion close to the outer peripheral edge of the substrate 30 toward the center portion (see an arrow I2).

The current indicated by the arrow I2 flows generally in a direction along the slit 305 and parallel to the slit 305. The currents indicated by the arrows I3 and I4 generally flow from the center portion of the substrate 30 toward the portion close to the outer peripheral edge. The direction of the current indicated by the arrows I3 and I4 is a direction perpendicular to the slit 305. Although the arrows I3 and I4 indicate the currents of the three phases, the current paths indicated by the arrows I3 and I4 are controlled so that the currents of the phases do not flow simultaneously, but flow alternately.

(Ground Inflow Path of Current)

A current path until the current flowing from the motor 80 into the ECU 10 flows into the ground will be described by use of arrows I5 to I8 attached to the first system L1 in the drawing. Although the arrows I5 to I8 are not shown in the second system L2, a current path similar to that of the first system L1 is formed.

As indicated by the arrow I5 in FIG. 8, the current flowing from the first winding 180 to the motor wire connection portion 186 flows to the motor relays 127 to 129. Thereafter, as indicated by the arrow I6 in FIG. 8, a current flows from the motor relays 127 to 129 of each phase to the switching elements 124 to 126 of the lower arm L. Thereafter, as indicated by the arrow I7 in FIG. 8, a current flows from the switching elements 124 to 126 of each phase to the shunt resistors 137 to 139. Thereafter, the current flows into the ground pattern P13 through the solid vias 35 and the plating 36. The current flowing into the ground pattern P13 from each phase flows into the first ground terminal connection portion 152 as indicated by the arrow I8 in FIG. 8.

In short, the ground pattern P13 is generally a flat shape disposed in a portion of the substrate 30 close to the slit 305 and extending in a direction along the slit 305. The current flowing through the ground pattern P13 flows along the slit 305 from the center portion of the substrate 30 toward the portion close to the outer peripheral edge (see the arrow I8). In other words, the current flowing through the ground pattern P13 flows in opposition to the current flowing through the power supply pattern P12.

The currents indicated by the arrows I5 and I6 generally flow from the portion close to the outer peripheral edge of the substrate 30 toward the center portion. The direction of the current indicated by the arrows I5 and I6 is a direction perpendicular to the slit 305. Although the arrows I5 and I6 indicate the currents of the three phases, the current paths shown by the arrows I5 and I6 are controlled so that the currents of the phases do not flow simultaneously, but flow alternately.

(Positional Relationship of Wiring Patterns)

The ground pattern P13 of the first system L1 is shaped to include the whole of the power supply patterns P11 and P12 of the first system L1 when viewed from the plate surface perpendicular direction. In the same manner, the ground pattern P23 of the second system L2 is shaped to include the whole of the power supply patterns P21 and P22 of the second system L2 when viewed from the plate surface perpendicular direction. In other words, the whole of the power supply patterns P11 to P22 is overlapped with the ground patterns P13 and P23 when viewed from the plate surface perpendicular direction.

Among the multiple wiring layers, when the surface layer 31 on the motor surface 301 side is defined as a "first layer" and the inner layer 33 located adjacent to the first layer is defined as a "second layer", an area of each pattern has the following magnitude relationship. In the first system L1, an area of the second layer ground pattern portion, which is the ground pattern P13 provided in the second layer, is larger than an area of the first layer power supply pattern portion, which is the power supply pattern P12 provided in the first layer.

When the surface layer 32 on the cover surface 302 side is defined as the "first layer", the area of the second layer ground pattern portion, which is the ground pattern P13 provided in the second layer, is larger than the area of the first layer power supply pattern portion, which is the power supply pattern P11 provided in the first layer.

As described above, the rotation angle sensor 29 is disposed in a region of the substrate 30 facing the opening 837a through which the rotation shaft 870 is inserted and disposed (opening facing region). The power supply pattern and the ground pattern are disposed at positions not overlapping with the rotation angle sensor 29 when viewed from the plate surface perpendicular direction.

(Positional Relationship of Mount Components)

The circuits configuring the inverters 120 and 220 are referred to as "power conversion circuits", and the power conversion circuits are divided into "on-off fluctuation units", "power supply units", and "output units".

The on-off fluctuation unit is a portion of the power conversion circuit which fluctuates so that the on and off of the current is switched. The on-off fluctuation unit includes the switching elements 121 to 123 and 221 to 223 configuring the upper arm H, the switching elements 124 to 126 and 224 to 226 configuring the lower arm L, the shunt resistors 137 to 239, and the wirings connecting those elements.

The power supply unit is a portion for supplying an electric power to the on-off fluctuation unit. The power supply unit includes a wiring (P wiring) for supplying the electric power to the upper arm H for each phase. The P wiring includes the power supply patterns P12 and P22.

The electric power is constantly supplied from the P wiring to any upper arm H of each phase. For that reason, the current flowing through the P wiring does not fluctuate so that the on and off of the current is switched. The wiring branched from the P wiring and drawn into each of the switching elements 121 includes a portion which does not perform the on-off fluctuation in the same manner as the P wiring. For example, a portion between the two power supply relays 131 and 132 and a portion between the power supply relay 132 and the switching element 121 do not perform the on-off fluctuation. On the other hand, a portion between the two switching elements 121 and 122 and a portion between the two switching elements 122 and 123 perform the on-off fluctuation and correspond to an on-off fluctuation unit.

The output unit is a portion through which a current output from the on-off fluctuation unit flows. The output unit includes wirings (O wiring) for connecting a middle point of the upper arm H and the lower arm L to the motor relays 127 to 229. The output unit also includes the motor relays 127 to 229 and the motor wire connection portions 186, 286. Further, the output unit includes wirings (O wirings) for connecting the motor relays 127 to 229 and the motor wire connection portions 186 and 286.

The current output from the upper arm H and the current output from the lower arm L alternately flow through the O wiring. For that reason, although the direction of the current flowing through the O wiring changes periodically, the current flowing through the O wiring does not fluctuate so that a current-on period and a current-off period are alternately switched.

The on-off fluctuation unit is disposed between the power supply unit and the output unit when viewed from the plate surface perpendicular direction. More specifically, a portion of the lower arm L (including shunt resistors) for three phases in the on-off fluctuation unit is disposed between the power supply patterns P11 and P22 and the motor relays 127 to 229.

Those placements will be described in detail. The substrate 30 is partitioned into a region of the first system L1 and a region of the second system L2. The boundaries of those regions are linear, for example, the linear slit 305 is a boundary of the compartments. In the direction perpendicular to the boundary line (slit 305), the power supply unit, the on-off fluctuation unit, and the output unit are arrayed in order when viewed from the plate surface perpendicular direction. The power supply unit is disposed at a side closer to the boundary line than the output unit. The output unit is disposed closer to the outer peripheral edge than the power supply portion.

The shunt resistors 137 to 239 are disposed at positions outside the region between the switching elements 124 to 226 of the lower arm L and the output unit when viewed from the plate surface perpendicular direction. More specifically, the shunt resistors 137 to 239 are disposed at positions outside the region between the switching elements 121 to 223 of the upper arm H and the switching elements 124 to 226 of the lower arm L when viewed from the plate surface perpendicular direction.

According to the present embodiment, in the first system L1, the power supply patterns P11 and P12 corresponding to the first layer power supply pattern portion and the ground pattern P13 corresponding to the second layer ground pattern portion are disposed so as to overlap with each other when viewed from the plate surface perpendicular direction. For that reason, a loop formed by the power supply patterns P11 and P12 and the ground pattern P13 is reduced when viewed from the plate surface perpendicular direction. For that reason, a loop formed by the power supply patterns P11 and P12 and the ground pattern P13 is reduced when viewed from the plate surface perpendicular direction.

In the same manner, in the second system L2, the power supply patterns P21 and P22 corresponding to the first layer power supply pattern portion and the ground pattern P23 corresponding to the second layer ground pattern portion are disposed so as to overlap with each other when viewed from the plate surface perpendicular direction. For that reason, a loop formed by the power supply patterns P21 and P22 and the ground pattern P23 is reduced when viewed from the plate surface perpendicular direction.

Therefore, in each system, both the loop-shaped patterns can be inhibited from functioning as an antenna. For that reason, the noise generated by the switching of the inverter circuit can be inhibited from being emitted as emission noise which is an electromagnetic wave. In addition to the switching noise described above, an electromagnetic wave noise caused by a large current flowing in both of the patterns is also inhibited by a reduction of the loop.

Further, in the present embodiment, inner vias 35a extending across the first layer and the second layer and solid vias 35 (conductive members) provided in the inner vias 35a are provided. The ground pattern P13 includes a first layer ground pattern portion formed in the first layer. The ground pattern P13a shown in FIG. 6 corresponds to a first layer ground pattern portion. The ground pattern P13 of the second layer and the ground pattern P13a of the first layer are electrically connected to each other by the multiple solid vias 35.

In the wiring of the power conversion circuit, it may be desirable to increase the thickness of the wirings to lower the impedance in order to reduce a heat generation caused a large current flow. However, when the wiring is thickened, a wiring width and a wiring gap may become large due to a substrate manufacturing restriction, and a fine wiring cannot be formed. For that reason, it may be unsuitable to wire a control circuit requiring a high-density layout. Therefore, if both the power conversion circuit and the control circuit are provided on the same substrate to achieve miniaturization, there may be a case where it is difficult to achieve both lowering in the impedance and miniaturization of the wiring.

In the present embodiment, as described above, the ground patterns P13 and P13a provided in the respective layers are connected to each other by the multiple solid vias 35. For that reason, the current can flow in the ground patterns P13 and P13a of the different layers with low impedances. This makes it possible to realize a reduction in impedance without thickening the wiring, and makes it possible to realize both the reduction in impedance and the miniaturization of the wiring.

The ground patterns P13 and P13a provided in the respective layers are connected to each other by the solid vias 35. For that reason, as compared with the case of connection by the cylindrical plating 36 in which a space is provided inside, the impedance reduction can be accelerated. In addition, as the impedances can be reduced in this manner, the ground patterns P13 and P13a can be reduced in heat generation and voltages.

Further, in the present embodiment, the on-off fluctuation unit that fluctuates to switch on and off the current is disposed between the power supply unit and the output unit when viewed from the plate surface perpendicular direction. According to the above configuration, since the on-off fluctuation unit in which noise is apt to occur is disposed between the power supply unit and the output unit in which voltage is stable, the noise generated in the on-off fluctuation unit can be inhibited from being radiated as emission noise.

The shunt resistors 137 to 239 are connected to the ground patterns P13 and P23. For that reason, the loop becomes smaller as the shunt resistors 137 to 239 are disposed closer to the power supply patterns P12 and P22. From the above viewpoints, according to the present embodiment, the shunt resistors 137 to 239 are disposed at positions outside the region between the switching elements 124 to 226 of the lower arm L and the output unit when viewed from the plate surface perpendicular direction. For that reason, as compared with the case where the shunt resistors 137 to 239 are disposed in the above-mentioned region, the above-mentioned loop can be reduced, and the effect of reducing the emission noise can be promoted.

Further, in the present embodiment, the rotation angle sensor 29 (sensor element) is disposed on the center line Ax of the rotation shaft 870 in the substrate 30. More specifically, the rotation angle sensor 29 is disposed in an opening facing region of the substrate 30 facing the opening 837a through which the rotation shaft 870 is inserted and disposed. The power supply patterns P11 to P22 and the ground patterns P13 and P23 are disposed at positions not overlapping with the rotation angle sensor 29 when viewed from the plate surface perpendicular direction.

According to the above configuration, a change in the magnetic field by the magnet 875 can be inhibited from being affected by the large current flowing through the power supply patterns P11 to P22 and the ground patterns P13 and P23. Therefore, a decrease in detection accuracy due to the rotation angle sensor 29 can be inhibited.

Further, in the present embodiment, the area of the second layer ground pattern portion is larger than the area of the first layer power supply pattern portion. Specifically, in each system, the areas of the ground patterns P13 and P23 are larger than the areas of the power supply patterns P12 and P22. For that reason, the stabilization of the potential of the ground can be promoted. Further, when viewed from the plate surface perpendicular direction, the whole of the first layer power supply pattern portion overlaps with the second layer ground pattern portion. For that reason, the loop described above can be further reduced as compared with the case where the loop is partially overlapped.

Since various electronic components are mounted on the surface layer, it may be difficult to secure a large area of the wiring pattern as compared with the inner layer. In view of the above point, in the present embodiment, the first layer in which the power supply pattern portions P12 and P22 are formed is the surface layer, and the second layer in which the ground pattern portions P13 and P23 are formed is the inner layer. This makes it possible to easily secure a large area of the ground pattern portions P13 and P23, and makes it possible to improve the stabilization of the ground potential.

Further, in the present embodiment, the electric power conversion circuit supplies an electric power to the motor 80 of the EPS 8 which exhibits a steering force of the vehicle. Since the motor 80 for the EPS 8 has a characteristic that a large current flows instantaneously, the emission noises are likely to occur. For that reason, the effect of inhibiting the emission noise according to the present embodiment is suitably exhibited.

Other Embodiments

Although multiple embodiments of the present disclosure have been described above, not only the combinations of the configurations explicitly shown in the description of each embodiment, but also the configurations of multiple embodiments can be partially combined even if the combination is not explicitly shown if there is no problem in the combination in particular. Unspecified combinations of the configurations described in the multiple embodiments and the modification examples are also disclosed in the following description.

In the embodiment shown in FIG. 8, the whole of the first layer power supply pattern portion overlaps with the second layer ground pattern portion when viewed from the plate surface perpendicular direction. On the other hand, a part of the first layer power supply pattern portion may be overlapped with the second layer ground pattern portion.

In the embodiment shown in FIG. 6, the first layer ground pattern portion and the second layer ground pattern portion are connected to each other by the multiple solid vias 35, but the first layer ground pattern portion and the second layer ground pattern portion may be connected to each other by one solid via 35. The solid conductive members (solid vias 35) may be replaced with a hollow conductive member such as plating. In the embodiment shown in FIG. 6, the solid vias 35 are used to connect the two wiring layers to each other, but may connect three or more wiring layers to each other, or may connect all the wiring layers to each other.

In the embodiment shown in FIG. 8, the on-off fluctuation unit is disposed between the power supply unit and the output unit when viewed from the plate surface perpendicular direction. On the other hand, some or all of the on-off fluctuation unit may be disposed at a position outside the region between the power supply unit and the output unit. In the example of FIG. 8, the power source unit is disposed at a side closer to the boundary line than the output unit, and the output unit is disposed at a side closer to the outer peripheral edge than the power supply unit. On the other hand, the placement of the power supply unit and the output unit may be reversed.

In the embodiment shown in FIG. 8, the shunt resistors 137 to 239 are placed at positions outside the regions between the switching elements 124 to 226 of the lower arm L and the output unit. On the other hand, some or all of the shunt resistors 137 to 239 may be located in the region described above.

In the embodiment shown in FIG. 8, both the power supply pattern and the ground pattern are disposed at positions not overlapping with the rotation angle sensor 29 when viewed from the plate surface perpendicular direction. On the other hand, at least one of the power supply pattern and the ground pattern may overlap with the rotation angle sensor 29.

In the embodiment shown in FIG. 8, the first layer power supply pattern portions to be overlapped are provided on the surface layers 31 and 32, but the power supply pattern portions provided on the inner layer 33 may to be overlapped with each other. The second layer ground pattern portion to be overlapped is not limited to the one provided on the inner layer 33, and may be one provided on the surface layers 31 and 32.

In the embodiment shown in FIG. 8, both the first layer power supply pattern portion on the motor surface 301 side and the first layer power supply pattern portion on the cover surface 302 side are overlapped with the second layer ground pattern portion. On the other hand, any one of the first layer power supply pattern portions on the motor surface 301 side and the cover surface 302 side may be overlapped.

In the embodiment shown in FIG. 8, the area of the second layer ground pattern portion is larger than the area of the first layer power supply pattern portion. On the other hand, the area size relationship may be reversed.

In the example shown in FIG. 2, the opening 837a is provided in the rear frame end 837, and the rotation shaft 870 is inserted through the opening 837a. The magnet 875 attached to the tip of the rotation shaft 870 is exposed from the opening 837a and faces the rotation angle sensor 29. On the other hand, the opening 837a may be eliminated, and a part of the rear frame end 837 may be interposed between the rotation angle sensor 29 and the magnet 875. However, even in this case, it is desirable to dispose the rotation angle sensor 29 on the center line Ax of the rotation shaft 870.

In the first embodiment, the first layer in which the power supply pattern portions P12 and P22 are formed is the surface layer, and the second layer in which the ground pattern portions P13 and P23 are formed is the inner layer. On the other hand, the first layer may be an inner layer. The second layer may be a surface layer.

In the embodiment shown in FIG. 1, the power conversion device includes the motor 80 for the EPS 8 motor 80 as a power supply target. On the other hand, another motor, such as a motor for vehicle travel, may be a power supply target. In the first embodiment, a circuit configuring the inverters 120 and 220 is applied to the power conversion circuit provided on the substrate 30, but a boosting circuit may be applied.

In the embodiment shown in FIG. 3, the components configuring the first system L1 and the components configuring the second system L2 in the drive device 1 are mounted on a single substrate 30. On the other hand, those components may be separately mounted on the multiple substrates. The components configuring the first system L1 include the first inverter 120, the first motor relays 127 to 129, the first power supply relays 131 and 132, the first capacitor 134, the first coil 135, and the like. The components configuring the second system L2 include the second inverter 220, the second motor relays 227 to 229, the second power supply relays 231 and 232, the second capacitor 234, and the second coil 235.

In the embodiment shown in FIG. 3, the switching elements 121 to 126, the motor relays 127 to 129, and the power supply relays 131, 132 are all MOSFET. On the other hand, an IGBT, a thyristor, or the like may be used. The power supply relays 131 and 132 may be mechanical relays. The second system L2 may be an IGBT, a thyristor, or a mechanical relay instead of the MOSFET in the same manner as the first system L1.

Although the embodiment shown in FIG. 3 includes an inter-system ground connection capacitor 41, the inter-system ground connection capacitor 41 may be eliminated. Although the embodiment shown in FIG. 3 includes electromechanical connection capacitors 142 and 242, those electromechanical connection capacitors 142 and 242 may be eliminated. In this case, it may be omitted that the ground pattern for each system or the power supply pattern for each system is divided and disposed in each region separated by the slit 305.

The inter-system ground connection capacitor 41 is mounted on the substrate 30, and electrically connects the ground for each system. This makes it possible to form a path for feeding back the noise propagated to the other system side through the motor windings 180 and 280 and the like to the host system on the substrate 30. The electromechanical connection capacitors 142 and 242 connect the housing connection patterns 156, 157, 256, and 257 to the ground pattern of the substrate 30. This makes it possible to form a low-impedance path for feeding back the noises propagated to the motor 80 side to the ECU 10 including the inverters 120 and 220. Therefore, the propagation of noise to the outside of the drive device 1, such as a vehicle, can be reduced.

In the first embodiment, the power conversion circuit and the control circuit for controlling the operation of the power conversion circuit are provided on one common substrate 30. The power conversion circuit is provided by the inverters 120 and 220, and the control circuit is provided by the microcomputers 170 and 270 and the pre-drivers 176 and 276. Both the power wiring pattern of the power conversion circuit and the control wiring pattern (not illustrated) of the control circuit are formed on the substrate 30. Specific examples of the power wiring patterns include the ground patterns P13 and P23, the power supply patterns P11 and P21, and the like. Alternatively, the power conversion circuit and the control circuit may be provided on separate substrates. In this case, the power wiring pattern and the control wiring pattern are provided on different substrates.

In the first embodiment, a control circuit is provided for each of the power conversion circuits of the two systems, and the control circuit is also configured in two systems. On the other hand, a control circuit may be common to each of the power conversion circuits of the two systems, and the control circuit may be configured as a single system. In addition, all the circuits including the power conversion circuit may be configured as one system.

The inverter 120 corresponds to a power conversion circuit. The inverter 220 corresponds to a power conversion circuit. The substrate 30 corresponds to a multilayer substrate. The surface layers 31 and 32 correspond to a first layer. The inner layer 33 corresponds to a second layer. The solid via 35 corresponds to a conductive member. The inner via 35a corresponds to a via. The power supply pattern P12 corresponds to a first layer power supply pattern portion. The ground pattern P13 corresponds to a second layer ground pattern portion. The ground pattern P13a corresponds to a first layer ground pattern portion. The power supply pattern P22 corresponds to a first layer power supply pattern portion. The ground pattern P23 corresponds to a second layer ground pattern portion.

While various embodiments, configurations, and aspects of a power conversion device according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A power conversion device comprising:
   a power conversion circuit that is configured to convert a supplied electric power and to output the converted power; and
   a multilayer substrate that includes the power conversion circuit, and has a wiring pattern,
   wherein:
   the wiring pattern of the multilayer substrate includes
      a power supply pattern that is connected to a high potential side of the power conversion circuit to supply electric power, and
      a ground pattern that is connected to a low potential side of the power conversion circuit;
   the multilayer substrate includes a first layer and a second layer;
   the power supply pattern includes a first layer power supply pattern portion in the first layer;
   the ground pattern includes a second layer ground pattern portion in the second layer; and
   the first layer power supply pattern portion and the second layer ground pattern portion overlap with each other at least in part in a direction perpendicular to a plate surface of the multilayer substrate,
   the power conversion device further comprising:
   a via that is installed in the multilayer substrate, and extends across the first layer and the second layer; and
   a conductive member that is installed in the via, and
   wherein:
   the ground pattern further includes a first layer ground pattern portion in the first layer; and
   the first layer ground pattern portion and the second layer ground pattern portion are electrically connected to each other by the conductive member installed in the via.

2. The power conversion device according to claim 1, wherein
   the conductive member is embedded in the via to be solid.

3. The power conversion device according to claim 1, wherein:
   an on-off fluctuation unit of the power conversion circuit fluctuates to switch on and off current;

a power supply unit of the power conversion circuit supplies electric power to the on-off fluctuation unit;
an output unit of the power conversion circuit causes a current output from the on-off fluctuation unit to flow; and
the on-off fluctuation unit is arranged between the power supply unit and the output unit in the direction perpendicular to the plate surface of the multilayer substrate.

4. The power conversion device according to claim 1, wherein:
an on-off fluctuation unit of the power conversion circuit fluctuates to switch on and off current;
an output unit of the power conversion circuit causes current output from the on-off fluctuation unit to flow;
the on-off fluctuation unit includes a switching element;
the on-off fluctuation unit further includes a shunt resistor that is configured to detect a value of current flowing from the switching element to a ground; and
the shunt resistor is arranged at a position away from a region between the switching element and the output unit in the direction perpendicular to the plate surface of the multilayer substrate.

5. The power conversion device according to claim 1, wherein:
the power conversion circuit outputs the electric power to a motor having a winding, a stator, a rotor, a rotation shaft, and a housing;
the housing accommodates the winding, the stator, and the rotor; and
the housing supports the multilayer substrate,
the power conversion device further comprising a sensor element that is installed on the multilayer substrate on a center line of the rotation shaft, and is configured to output a detection signal corresponding to a rotation angle of the rotation shaft,
wherein
at least one of the power supply pattern and the ground pattern is arranged at a position where the at least one of the power supply pattern and the ground pattern does not overlap with the sensor element in the direction perpendicular to the plate surface of the multilayer substrate.

6. The power conversion device according to claim 1, wherein
an area of the second layer ground pattern portion is larger than an area of the first layer power supply pattern portion.

7. The power conversion device according to claim 1, wherein
whole of the first layer power supply pattern portion overlaps with the second layer ground pattern portion in the direction perpendicular to the plate surface of the multilayer substrate.

8. The power conversion device according to claim 1, wherein:
the first layer is a surface layer located outermost of a plurality of layers of the multilayer substrate; and
the second layer is an inner layer located inside the plurality of layers of the multilayer substrate.

9. The power conversion device according to claim 1, wherein
the power conversion circuit supplies the electric power to a motor that generates a steering force of a vehicle.

10. A power conversion device comprising:
a power conversion circuit that is configured to convert a supplied electric power and to output the converted power; and
a multilayer substrate that includes the power conversion circuit, and has a wiring pattern,
wherein:
the wiring pattern of the multilayer substrate includes
a power supply pattern that is connected to a high potential side of the power conversion circuit to supply electric power, and
a ground pattern that is connected to a low potential side of the power conversion circuit;
the multilayer substrate includes a first layer and a second layer;
the power supply pattern includes a first layer power supply pattern portion in the first layer;
the ground pattern includes a second layer ground pattern portion in the second layer; and
the first layer power supply pattern portion and the second layer ground pattern portion overlap with each other at least in part in a direction perpendicular to a plate surface of the multilayer substrate, and
wherein
an area of the second layer ground pattern portion is larger than an area of the first layer power supply pattern portion.

11. A power conversion device comprising:
a power conversion circuit that is configured to convert a supplied electric power and to output the converted power; and
a multilayer substrate that includes the power conversion circuit, and has a wiring pattern,
wherein:
the wiring pattern of the multilayer substrate includes
a power supply pattern that is connected to a high potential side of the power conversion circuit to supply electric power, and
a ground pattern that is connected to a low potential side of the power conversion circuit;
the multilayer substrate includes a first layer and a second layer;
the power supply pattern includes a first layer power supply pattern portion in the first layer;
the ground pattern includes a second layer ground pattern portion in the second layer; and
the first layer power supply pattern portion and the second layer ground pattern portion overlap with each other at least in part in a direction perpendicular to a plate surface of the multilayer substrate;
the power conversion circuit includes an on-off fluctuation unit, which fluctuates to switch on and off current, and an output unit, which causes current output from the on-off fluctuation unit to flow;
the on-off fluctuation unit includes a switching element, which is connected to the second layer ground pattern portion, and a shunt resistor, which detects a value of current flowing from the switching element to a ground;
the shunt resistor is arranged at a position away from a region between the switching element and the output unit in the direction perpendicular to the plate surface of the multilayer substrate; and
an entire portion of the shunt resistor is overlapped with the second layer ground pattern portion in the direction perpendicular to the plate surface of the multilayer substrate.

\* \* \* \* \*